United States Patent [19]
Kushler et al.

[11] Patent Number: 5,945,928
[45] Date of Patent: Aug. 31, 1999

[54] REDUCED KEYBOARD DISAMBIGUATING SYSTEM FOR THE KOREAN LANGUAGE

[75] Inventors: Clifford A. Kushler, Lynnwood; Jin Bong Kim, Seattle, both of Wash.

[73] Assignee: Tegic Communication, Inc., Seattle, Wash.

[21] Appl. No.: 09/009,584

[22] Filed: Jan. 20, 1998

[51] Int. Cl.⁶ .................................................. G08B 11/00
[52] U.S. Cl. .............................. 341/28; 341/22; 345/171; 364/709.15; 364/209.12; 364/209.16
[58] Field of Search .................................. 341/28, 22, 23; 345/171; 364/709.12, 709.15, 709.16; 400/489

[56] References Cited

U.S. PATENT DOCUMENTS

| | | | |
|---|---|---|---|
| 5,087,910 | 2/1992 | Guyot-Sionnest | 341/22 |
| 5,210,689 | 5/1993 | Baker | 364/709.15 |
| 5,664,896 | 9/1997 | Blumberg | 400/485 |
| 5,786,776 | 7/1998 | Kisaichi | 341/23 |
| 5,847,697 | 12/1998 | Sugimoto | 345/168 |

*Primary Examiner*—Michael Horabik
*Assistant Examiner*—Albert K. Wong
*Attorney, Agent, or Firm*—Christensen O 'Connor; Johnson & Kindess PLLC

[57] ABSTRACT

A reduced keyboard disambiguating system for the Korean language using word-level disambiguation to resolve ambiguities in keystrokes. A plurality of letters are assigned to each of a plurality of data keys, so that keystrokes on these keys are ambiguous. A user may enter a keystroke sequence wherein each keystroke corresponds to the entry of one letter of a word. Because individual keystrokes are ambiguous, the keystroke sequence can potentially match more than one word with the same number of letters. The keystroke sequence is processed by matching the input keystroke sequence to corresponding stored words or other interpretations. The 14 consonant jamos of the Korean alphabet are assigned to the data keys in their standard alphabetical sequence. The 10 vowel jamos are likewise assigned to the same set of data keys in their standard alphabetical sequence, such that a majority of the data keys are assigned both one or more consonant jamos and one or more vowel jamos. The result is a reduced keyboard that is easily understood and quickly learned by native speakers of Korean, and that is efficient for purposes of disambiguating textual interpretations of input sequences of ambiguous keystrokes.

7 Claims, 6 Drawing Sheets

| ㅏㅑㄱ | ㅓㅕㄴ | ㄷㄹㅁ | ⬅ |
|---|---|---|---|
| ㅗㅛㅂ | ㅜㅠㅅ | ㅡ ㅇ | 구두점 |
| ㅣㅈㅊ | ㅋㅌ | ㅍㅎ | 숫자 |
| 다음 | 스페이스 | | |

*Fig. 5C.*

| ㄱㅏㅑ | ㄴㅓㅕ | ㄷㄹㅁ | ⬅ |
|---|---|---|---|
| ㅂㅗㅛ | ㅅㅜㅠ | ㅇㅈㅡ | 구두점 |
| ㅊㅋㅣ | ㅌㅐㅒ | ㅍㅎㅔㅖ | 숫자 |
| 다음 | 스페이스 | | |

*Fig. 5D.*

| ㄱㄲ | ㅏㅑ | ㄴ | ㅓㅕ | ㄷㄸㄹㅁ | ⬅ |
|---|---|---|---|---|---|
| ㅂㅃㅗㅛ | | ㅅㅆㅜㅠ | | ㅇ ㅡ | 구두점 |
| ㅈㅉㅊ | ㅣ | ㅋㅌㅐㅒ | | ㅍㅎ ㅔㅖ | 숫자 |
| 다음 | | 스페이스 | | | |

*Fig. 5E.*

| ㄱ | ㅏ | ㄴ | ㅓ | ㄷㄹㅁ | ⬅ |
|---|---|---|---|---|---|
| ㅂ | ㅗ | ㅅ | ㅜ | ㅇ ㅡ | 구두점 |
| ㅈㅊ | ㅣ | ㅋㅌ | | ㅍㅎ | 숫자 |
| 다음 | | 스페이스 | | | |

*Fig. 5F.*

REDUCED KEYBOARD DISAMBIGUATING SYSTEM FOR THE KOREAN LANGUAGE

FIELD OF THE INVENTION

The invention relates generally to reduced keyboard systems, and more specifically to reduced keyboard systems using word-level disambiguation to resolve ambiguous keystrokes for the Korean language.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a keyboard for entry of text into a computer device that is both small and operable with one hand while the user is holding the device with the other hand. Prior development work has considered use of a keyboard that has a reduced number of keys. As suggested by the keypad layout of a touch-tone telephone, many of the reduced keyboards have used a 3-by-4 array of keys. A number of the keys in the array contain multiple characters. There is therefore ambiguity in a sequence of keys entered by a user, since each keystroke may indicate one of several letters. Several approaches have been suggested for resolving the ambiguity of the keystroke sequence.

One suggested approach for unambiguously specifying characters entered on a reduced keyboard requires the user to enter two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word-level disambiguation to decode text from a reduced keyboard. Word-level disambiguation disambiguates entire words by comparing the sequence of received keystrokes with possible matches in a dictionary after the receipt of an unambiguous character signifying the end of the word. The Arnott article discusses many of the disadvantages of word-level disambiguation. For example, word-level disambiguation oftentimes fails to decode a word correctly, because of the limitations in identifying unusual words and the inability to decode words that are not contained in the dictionary. Because of the decoding limitations, word-level disambiguation does not give error-free decoding of unconstrained text with an efficiency of one keystroke per character. The Arnott article therefore concentrates on character level disambiguation rather than word-level disambiguation, and indicates that character level disambiguation appears to be the most promising disambiguation technique.

Disambiguating an ambiguous keystroke sequence continues to be a challenging problem. One significant challenge facing any application of word-level disambiguation is designing a keyboard that enables the system to efficiently disambiguate input keystroke sequences. With an ordinary typewriter or word processor, each keystroke represents a unique character. With word-level disambiguation, since each keystroke represents multiple characters, any sequence of keystrokes may match multiple words or word stems. It would therefore be desirable to develop a disambiguating system that minimizes the ambiguity of entered keystrokes, and also maximizes the efficiency with which the user can resolve any ambiguity which does arise during text entry.

This means that the arrangement of letters on keys should tend to minimize the average number of word choices that correspond to a given keystroke sequence, and in particular to minimize the number of instances where two different frequently occurring words correspond to the same keystroke sequence. Optimizing a keyboard arrangement according to this criterion tends to result in arrangements where letters appear to have been randomly grouped on the keys. Thus, although such arrangements are ultimately efficient to use, they are difficult to learn, and may not be acceptable to many users due to their unfamiliar appearance.

The alternative is to design keyboards based on organizing letters according to a common or well known arrangement of the letters of a language. This results in a keyboard with an appearance which is more familiar to the general user, and thus tends to be more acceptable and easier to learn. However, this goal can conflict with the goal of designing a keyboard that increases the efficiency with which key sequences can be disambiguated.

In order to create an effective word-level disambiguating reduced keyboard input system for the Korean language, a keyboard must be designed that meets both of these criteria. First, the arrangement of the letters of the Korean language (jamos) must be easy for a native speaker to understand and learn to use. Second, the arrangement must not result in so much ambiguity that the efficiency of the reduced keyboard system is impaired.

SUMMARY OF THE INVENTION

The present invention provides a reduced keyboard for the Korean language which uses word-level disambiguation to resolve ambiguities in keystrokes. In one embodiment, the system is implemented on a display panel which is touch sensitive, wherein contact with the surface of the display generates input signals to the system corresponding to the location of contact. Alternatively, the keyboard can be constructed with mechanical keys, such as on a standard cellular telephone keypad.

A plurality of letters and symbols are assigned to some of the keys, so that keystrokes on these keys (hereinafter the "data keys") are ambiguous. A user may enter a keystroke sequence wherein each keystroke corresponds to the entry of one letter of a word. Because individual keystrokes are ambiguous, the keystroke sequence can potentially match more than one word with the same number of letters. The keystroke sequence is processed by vocabulary modules which match the sequence to corresponding stored words or other interpretations. Words and word stems that match the sequence of keystrokes are presented to the user in a selection list on the display as each keystroke is received.

The present invention discloses a design for arranging the jamos of the Korean alphabet on a keyboard in such a way as to meet the above two criteria. The Korean alphabet consists of 24 jamos—14 consonants and 10 vowels. The keyboard of the present invention assigns the 14 consonant jamos to the data keys in their standard alphabetical sequence. The 10 vowel jamos are likewise assigned to the same set of data keys in their standard alphabetical sequence, such that a majority of the data keys are assigned both one or more consonant jamos and one or more vowel jamos. The result is a reduced keyboard that is easily understood and quickly learned by native speakers of Korean, and that is efficient for purposes of disambiguating textual interpretations of input keystroke sequences.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A–5F are schematic views of alternate embodiments of a computer touchscreen incorporating a reduced keyboard disambiguating system of the present invention.

DETAILED DESCRIPTION OF THE PREFERRED EMBODIMENT

The present invention provides a reduced keyboard for the Korean language which uses word-level disambiguation to resolve ambiguities in keystrokes. A plurality of letters (jamos) are assigned to some of the keys, so that keystrokes on these data keys are ambiguous. A user may enter a keystroke sequence wherein each keystroke corresponds to the entry of one jamo of a word. Because individual keystrokes are ambiguous, the keystroke sequence can potentially match more than one word with the same number of jamos. The keystroke sequence is processed by matching the sequence of input keys to corresponding stored words or other interpretations. Words and word stems that match the sequence of keystrokes are presented to the user on the display as each keystroke is received. Such word-level disambiguation is described in more detail in commonly assigned U.S. patent application Ser. No. 08/686,955 entitled "Reduced Keyboard Disambiguating System," the disclosure and drawings of which are incorporated herein by reference.

In order to create an effective word-level disambiguating reduced keyboard input system for the Korean language, a keyboard must be designed to meet two important criteria. First, the arrangement of the jamos on the keys must be easy for a native speaker to understand and learn to use. Second, the arrangement must not result in so much ambiguity that the efficiency of the reduced keyboard system is impaired.

Figure 1:
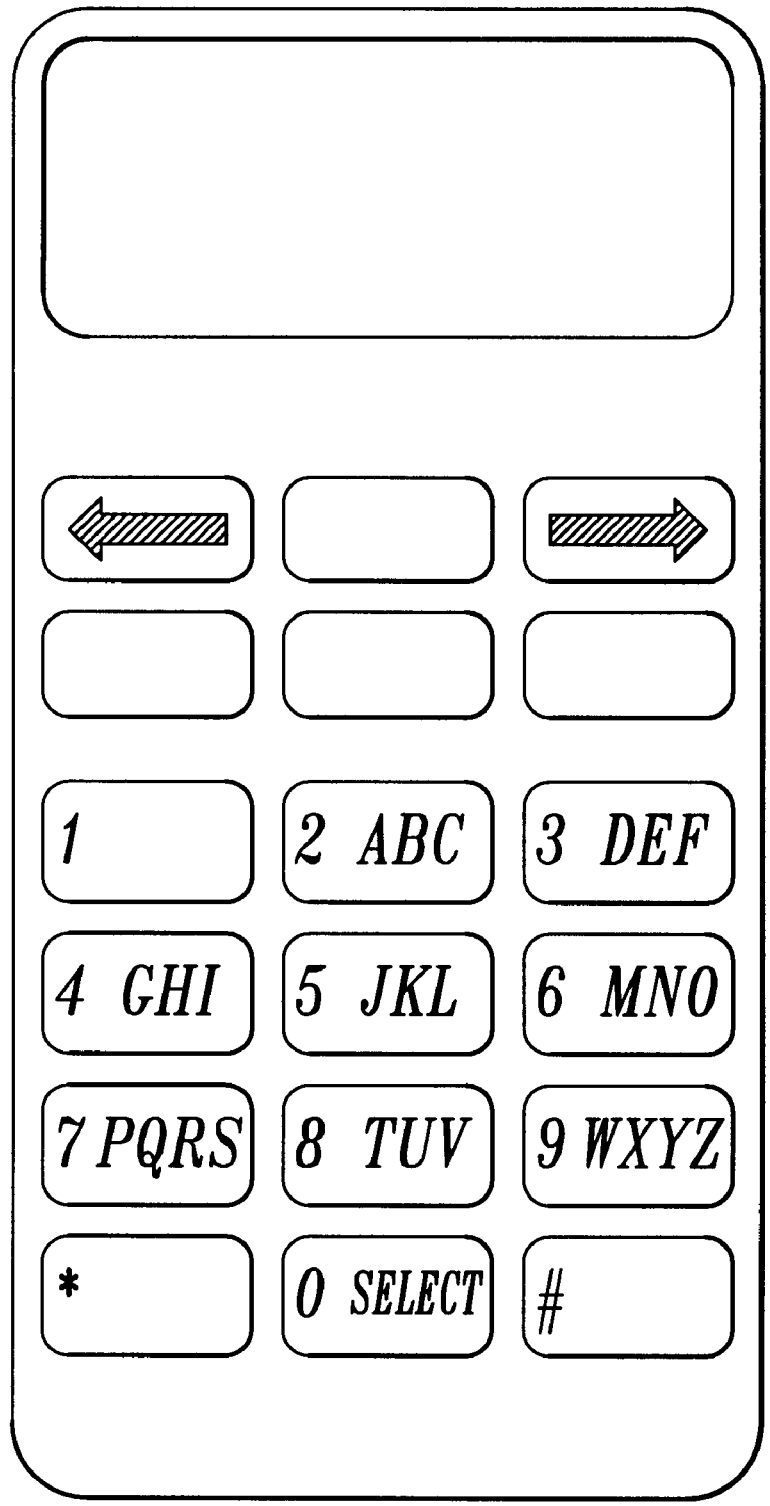
FIG. 1 is a schematic view of a cellular telephone keypad incorporating a reduced keyboard disambiguating system for the English language.
Figure 2:
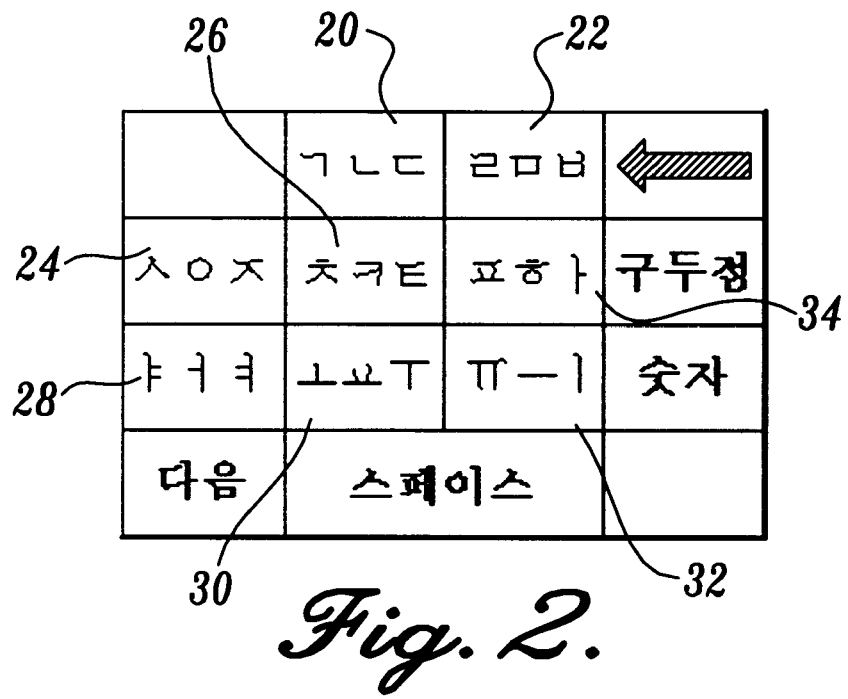
FIG. 2 is a schematic view of a computer touchscreen incorporating a reduced keyboard disambiguating system for the Korean language in which letters have been assigned in strict lexicographic order.

Although the Korean language is based on an alphabet, there are unique problems associated with arranging the jamos on a reduced keyboard to meet the above two criteria. The Korean alphabet consists of 24 jamos—14 consonants and 10 vowels. These jamos are combined into syllables (hangul) whose structure is either a consonant followed by a vowel (CV) or consonant-vowel-consonant (CVC), where C may represent a consonant cluster and V may represent a diphthong. The most easily understood approach to assigning letters to a reduced keyboard is to assign them sequentially in their standard alphabetical (lexicographic) order, distributing the letters approximately equally among the keys. An example of this is the standard "ABC" arrangement of English letters on a modem cellular telephone keypad, as shown in FIG. 1. This arrangement is obviously easy to understand and learn for a native English speaker. It also works reasonably well for a text input method based on word-level disambiguation, primarily because each of the vowels and semi-vowels a, e, i, o, u, and y are assigned to separate keys. A problem arises in the case of the Korean language because the standard lexicographic order presents all 14 of the consonants in a standard order, and separately presents all 10 of the vowels in a standard order. When all of the jamos are presented together, the list of vowels conventionally follows the list of consonants. Sequentially assigning jamos to keys in the same manner in which letters are assigned on the standard English telephone keypad of FIG. 1 (using only eight data keys) would result in an arrangement such as that shown in FIG. 2, where four keys 20–26 are assigned only consonants and three keys 28–32 are assigned only vowels. Such an arrangement results in an unacceptably high level of ambiguity, since there are large numbers of words that have the same consonant and vowel structure (i.e. corresponding letter positions are of the same type), and it is common to find pairs of words that differ only in a small number of letter positions, where one vowel is substituted for another vowel, or one consonant for another consonant. In an arrangement such as that shown in FIG. 2, since all but one 34 of the possible data keys correspond to three alternative letters of the same type, the ambiguity of the system will tend to be unacceptably high.

Figure 3:
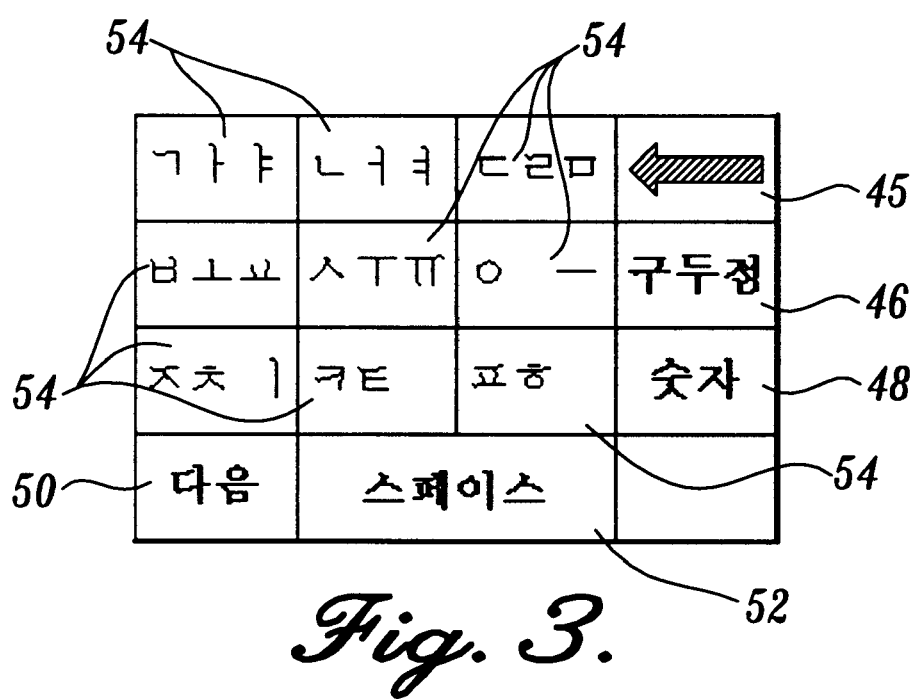
FIG. 3 is a schematic view of a preferred embodiment of a computer touchscreen incorporating a reduced keyboard disambiguating system of the present invention.
Figure 4:
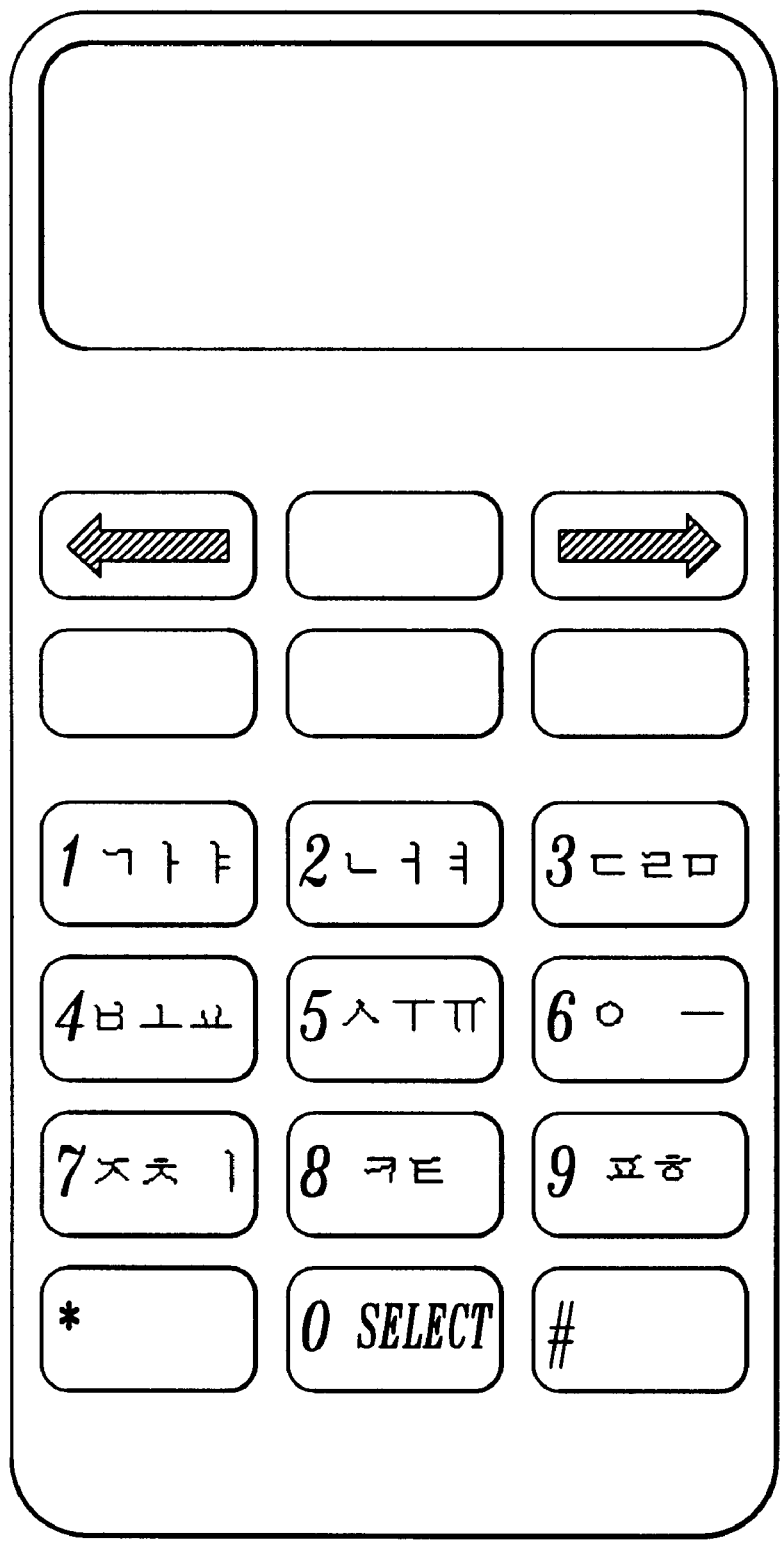
FIG. 4 is a schematic view of a preferred embodiment of a cellular telephone keypad incorporating the reduced keyboard disambiguating system as shown in FIG. 3.

To overcome this problem, the current invention re-distributes the jamos such that most keys are assigned some combination of both consonants and vowels. In order to make the arrangement intuitively easy to understand and learn, both the consonants and vowels are distributed across the keys in their standard lexicographic order. In one preferred embodiment, shown in FIG. 3, the jamos are distributed among nine data keys, where the consonants are placed on the left side of each key, and the vowels are placed on the right side. In addition, the keyboard arrangement shown in FIG. 3 includes five additional special function keys 45–52 that would be useful in a word-disambiguating text input system. These include a backspace key 45 to delete previous keystrokes, mode keys 46, 48 to change to special symbolic or numeric input modes, a "Select" key 50 to choose alternate word interpretations of ambiguous key sequences, and a spacebar. The function keys 45–52 included depend on the requirements for each specific application. FIG. 3 shows a representative set appropriate for a general purpose text input system. FIG. 4 shows the same preferred embodiment of the data keys as they might appear on the keypad of a cellular telephone.

Figures 5A, 5B:
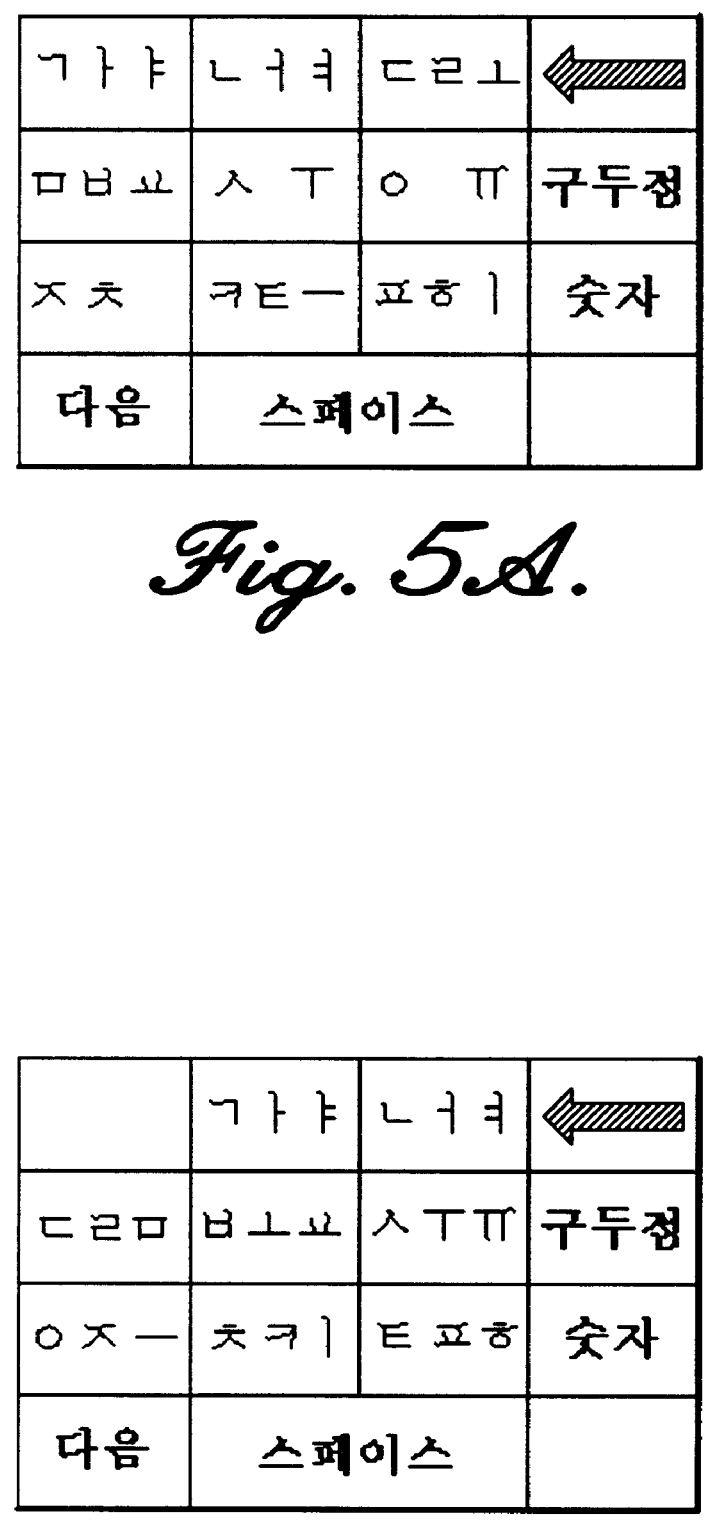

It will be evident to one of ordinary skill in the art that various modifications can be made to the arrangement of data keys 54 shown in FIG. 3 without departing from the scope of the invention. Jamos are moved to other data keys and still preserve the relative alphabetical ordering of the consonant jamos and of the vowel jamos, as shown in FIG. 5A. Jamos are moved so as to change the total number of data keys and still preserve the relative alphabetical ordering of the consonant jamos and of the vowel jamos, as shown in FIG. 5B. Letters are re-ordered on each key as shown in FIG. 5C without departing from the scope of the invention. Furthermore, additional letters, such as "YE" which is a diphthong composed of the vowels "YEO" and "I", are added as shown in FIG. 5D. The "double" consonants such as SSANGKIYEOK and SSANGTIKEUT are typed on the keyboard of FIG. 3 by pressing the key of the corresponding single consonant (e.g. KIYEOK and TIKEUT) twice in succession. As shown in FIG. 5E, like the diphthongs, these double consonants are added to the keyboard arrangement so that they can be typed with a single keystroke, without changing the fundamental characteristics of the arrangement. Conversely, as shown in FIG. 5F, the vowels YA, YEO, YO and YU are omitted from the keyboard and typed with two successive keystrokes on the key with the corresponding vowel A, EO, O or U, respectively. These different types of modifications can be combined in different ways to yield other alternate arrangements that do not differ fundamentally from the current invention. The essential aspects of the current invention are: that the arrangement of consonants appears in alphabetical order on the sequence of data keys; that the arrangement of vowels appears in alphabetical order on the sequence of data keys; and that the majority of keys include some combination of both consonants and vowels.

The combined effects of the assignment of multiple letters to keys as shown in FIG. 3, the delimiting of words using an unambiguous word selection key, the presentation of the most commonly occurring word or word stem as the default word when the keystroke sequence corresponds to more than one word, the automatic addition of a selected word to a sentence by the first keystroke of the following word, and the automatic addition of spaces produces a surprising result. Specifically, for the Korean language, text material can be typed on the system with extremely high efficiency. Approximately 98% of the words in a representative corpus of text can be typed using only one keystroke per jamo with the reduced key disambiguating system. Furthermore, the arrangement of letters on the keyboard is easily understood and quickly learned by native speakers of Korean. High speed entry of text is therefore achieved using a keyboard having a small number of full-size keys that is easy to learn and use.

The reduced keyboard disambiguation system disclosed herein reduces the size of the computer or other device that incorporates the system. The reduced number of keys allows a device to be constructed to be held by the user in one hand, while being operated with the other hand. The disclosed system is particularly advantageous for use with PDAs, two-way pagers, cellular phones, or other small electronic devices that benefit from accurate, high-speed text entry. The system provides both efficiency and simplicity when implemented on a touchscreen based device or a device with a limited number of mechanical keys that may also have limited display screen area.

Those skilled in the art will also recognize that minor changes can be made to the design of the keyboard arrangement, without significantly departing from the underlying principles of the current invention. Consequently, within the scope of the appended claims, it will be appreciated that the invention can be practiced otherwise than as specifically described herein.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A keyboard for a Korean language disambiguating text input system for disambiguating ambiguous keystrokes entered by a user, the keyboard comprising a plurality of data keys and one or more unambiguous keys, each of the plurality of data keys being assigned a plurality of jamos so that a textual interpretation of a keystroke sequence entered by the user is ambiguous, the keystroke sequence being terminated by a keystroke of one of the unambiguous keys, wherein:

(a) the 14 consonant jamos are assigned to the plurality of data keys in their standard alphabetical order: KIYEOK, NIEUN, TIKEUT, RIEUL, MIEUM, PIEUP, SIOS, IEUNG, CIEUC, CHIEUCH, KHIEUKH, THIEUTH, PHIEUPH, and HIEUH; and (b) the 10 vowel jamos are assigned to the plurality of data keys in their standard alphabetical order: A, YA, EO, YEO, O, YO, U, YU, EU, and I; and (c) the majority of keys are assigned some combination of one or more consonant jamos and one or more vowel jamos.

2. The system of claim 1, wherein for each data key which is assigned both consonant and vowel jamos, the one or more consonant jamos appear consistently on one side of the data key, and the one or more vowel jamos appear consistently on the opposite side of the key.

3. The system of claim 1, wherein the keyboard comprises nine data keys.

4. The system of claim 1, wherein the keyboard comprises eight data keys.

5. The system of claim 1, wherein one or more of the diphthongs AE, YAE, E, YE, WA, WAE, OE, WEO, WE, WI and YI, and the consonants SSANGKIYEOK, SSANGTIKEUT, SSANGPIEUP, SSANGSIOS and SSANGCIEUC have been added to one or more of the data keys.

6. The system of claim 1, wherein one or more of the vowels YA, YEO, YO, and YU are omitted from the data keys.

7. The system of claim 5, wherein one or more of the vowels YA, YEO, YO, and YU are omitted from the data keys.

* * * * *